(12) United States Patent
Tierney et al.

(10) Patent No.: US 8,454,888 B2
(45) Date of Patent: *Jun. 4, 2013

(54) APPARATUS FOR INJECTING GAS INTO A VESSEL

(75) Inventors: Eric Tierney, Crescent, PA (US); George Cingle, III, Gibsonia, PA (US); Todd Smith, Grove City, PA (US)

(73) Assignee: Technological Resources Pty. Limited, Victoria (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/205,311

(22) Filed: Aug. 8, 2011

(65) Prior Publication Data
US 2012/0200014 A1 Aug. 9, 2012

Related U.S. Application Data (62) Division of application No. 11/956,571, filed on Dec. 14, 2007, now Pat. No. 8,012,409.

(60) Provisional application No. 60/874,979, filed on Dec. 15, 2006.

(51) Int. Cl.
*C22B 7/00* (2006.01)

(52) U.S. Cl.
USPC .......................................... 266/270; 266/241

(58) Field of Classification Search
USPC .......................... 266/270, 268, 241
See application file for complete search history.

(56) References Cited

U.S. PATENT DOCUMENTS

| | | | |
|---|---|---|---|
| 3,892,393 A | 7/1975 | Carroll et al. | |
| 6,083,296 A | 7/2000 | Innes et al. | |
| 6,440,356 B2 | 8/2002 | Dunne | |
| 6,673,305 B2 | 1/2004 | Dunne et al. | |
| 7,588,718 B2 | 9/2009 | Williams et al. | |
| 7,687,020 B2 * | 3/2010 | Hardie | 266/270 |
| 2006/0108722 A1 | 5/2006 | Williams et al. | |
| 2009/0014928 A1 | 1/2009 | Williams | |

FOREIGN PATENT DOCUMENTS

| | | |
|---|---|---|
| GB | 991120 | 5/1965 |
| WO | WO 96/23082 A1 | 8/1996 |
| WO | WO 2006/042363 A1 | 4/2006 |
| WO | WO 2006/096902 A1 | 9/2006 |

OTHER PUBLICATIONS

European Search Report issued in European Patent Application No. 07024291.2, dated Jan. 21, 2011.

* cited by examiner

*Primary Examiner* — Scott Kastler
(74) *Attorney, Agent, or Firm* — Finnegan, Henderson, Farabow, Garrett & Dunner, LLP

(57) ABSTRACT

An apparatus for injecting particulate and/or gaseous material into a metallurgical vessel for use in a metallurgical process includes a duct to inject the material. The duct includes a duct wall of concentric annular passages for inflow of cooling water from a rear end to a forward end of the duct along a first of the annular passages and for outflow of cooling water from the forward end to the rear end of the duct wall along a second of the annular passages. The concentric annular passages are provided by concentric sleeves that consist of an inner sleeve, an outer sleeve, and an intermediate sleeve. The apparatus also includes a duct tip at a forward end of the duct joining at least the inner and outer sleeves so as to provide a water flow connection between the first and second water flow passages.

14 Claims, 8 Drawing Sheets

APPARATUS FOR INJECTING GAS INTO A VESSEL

PRIORTY

This application is a divisional of U.S. patent application Ser. No. 11/956,571, filed Dec. 14, 2007, now U.S. Pat. No. 8,012,409, which claims the benefit of U.S. Provisional Application No. 60/874,979, filed Dec. 15, 2006, each of which is incorporated by reference in their entirety.

The present invention provides an apparatus for injecting gas into a vessel. It has particular, but not exclusive application to apparatus for injecting a flow of gas into a metallurgical vessel under high temperature conditions. Such metallurgical vessel may for example be a smelting vessel in which molten metal is produced by a direct smelting process.

A known direct smelting process, which relies on a molten metal layer as a reaction medium, and is generally referred to as the HIsmelt process, is described in U.S. Pat. No. 6,083,296. The HIsmelt process as described in that Patent comprises:
(a) forming a bath of molten iron and slag in a vessel;
(b) injecting into the bath:
  (i) a metalliferous feed material, typically metal oxides; and
  (ii) a solid carbonaceous material, typically coal, which acts as a reductant of the metal oxides and a source of energy; and
(c) smelting metalliferous feed material to metal in the metal layer.

The term "smelting" is herein understood to mean thermal processing wherein chemical reactions that reduce metal oxides take place to produce liquid metal.

The HIsmelt process also comprises post-combusting reaction gases, such as CO and $H_2$ released from the bath in the space above the bath with oxygen-containing gas and transferring the heat generated by the post-combustion to the bath to contribute to the thermal energy required to smelt the metalliferous feed materials.

The HIsmelt process also comprises forming a transition zone above the nominal quiescent surface of the bath in which there is a favourable mass of ascending and thereafter descending droplets or splashes or streams of molten metal and/or slag which provide an effective medium to transfer to the bath the thermal energy generated by post-combusting reaction gases above the bath.

In the HIsmelt process the metalliferous feed material and solid carbonaceous material is injected into the metal layer through a number of lances/tuyeres which are inclined to the vertical so as to extend downwardly and inwardly through the side wall of the smelting vessel and into the lower region of the vessel so as to deliver the solids material into the metal layer in the bottom of the vessel. To promote the post combustion of reaction gases in the upper part of the vessel, a blast of hot air, which may be oxygen enriched, is injected into the upper region of the vessel through the downwardly extending hot air injection lance. To promote effective post combustion of the gases in the upper part of the vessel, it is desirable that the incoming hot air blast exit the lance with a swirling motion. To achieve this, the outlet end of the lance may be fitted with internal flow guides to impart an appropriate swirling motion. The upper regions of the vessel may reach temperatures of the order of 2000° C. and the hot air may be delivered into the lance at temperatures of the order of 1100-1400° C. The lance must therefore be capable of withstanding extremely high temperatures both internally and on the external walls, particularly at the delivery end of the lance which projects into the combustion zone of the vessel.

U.S. Pat. No. 6,440,356 discloses a gas injection lance construction designed to meet the extreme conditions encountered in the HIsmelt process. In that construction, the flow guides are in the form of spiral vanes mounted on a central body at the forward end of a gas flow duct. Those vanes are connected to the wall of the gas flow duct and are internally water cooled by cooling water which flows through supply and return passages within the wall of the duct. U.S. Pat. No. 6,673,305 discloses an alternative lance construction in which spiral flow guide vanes are mounted on a central tubular structure extending throughout the length of the gas flow duct. The central structure is provided with water flow passages which provide for the flow of cooling water to the front part of the central structure which is located generally within the tip of the gas flow duct. In that construction, the flow guide vanes are not cooled and are set back from the tip of the duct within a refractory lined wall section of the duct.

In the constructions disclosed in
U.S. Pat. Nos. 6,440,356 and 6,673,305 the tip of the duct is formed with a single annular space through which cooling water flows from the delivery passages to the return passages in the duct wall passages are of similar length. The present invention provides an improved construction which enables more effective cooling of the tip and improved structural strength. The invention may also be applied to the solids injection lances for injecting solid particulate material into the vessel.

According to the invention there is provided an apparatus for injecting particulate and/or gaseous material into a metallurgical vessel for performing a metallurgical process, the apparatus comprising
a duct through which to inject the material;
inner and outer water inflow and outflow passages extending through a wall of the duct respectively for inflow of cooling water from a rear end to a forward end of the duct and for outflow of cooling water from the forward end to the rearward end of the duct; and
an annular duct tip disposed at the forward end of the duct and providing a water flow connection between the inner and the outer water flow passages; and
wherein the duct tip is of annular formation and comprised of an annular inner end component, an annular outer end component, an annular central component located between the inner and outer components, and a plurality of radially extending dividers to divide a space between the outer end component and the central component into discrete radial passages to serve as said internal water flow passages of the tip.

The duct may be a gas flow duct for discharge of gas flow from the forward end of the duct.

The dividers may be in the form of ribs on the outer end component.

The central component may have a series of radial grooves to receive at least some of the ribs on the outer end component.

The ribs on the outer end component may comprise a first series of ribs spaced circumferentially of the outer end component and a second series of ribs spaced circumferentially of the outer end component between the ribs of the first series, the ribs of the first series projecting from the outer end component further than the ribs of the second series and being received by the series of grooves in the central component.

The ribs of the first series may be welded to the central component of the tip.

The ribs of the second series may abut the central component of the tip between the ribs of the first series.

The space between the outer end component of the tip and the central component which is divided by the ribs into said discrete water flow passages may progressively narrow in the radially outward directions along the passages.

The inner, outer and central components of the tip may be made of the same material and may be welded together. They may for example be formed of copper and that copper may be at least 99% pure to promote effective and even heat transfer through the tip.

The wall of the material injection duct may be comprised of concentrically spaced apart inner, intermediate and outer tubes forming inner and outer annular spaces subdivided into the inner and outer water flow passages.

The inner annular space may be subdivided into the inner water flow passages for water inflow by inner divider bars extending spirally around and welded to the outer peripheral surface of the inner duct tube and flush fitted within the intermediate duct tube.

The outer annular space may be subdivided into the outer water flow passages for water outflow by outer divider bars extending spirally around and welded to the outer peripheral surface of the intermediate duct tube and flush fitted within the outer duct tube.

The inner annular space may be wider in the radial direction than the outer annular space and the inner divider bars may be correspondingly taller in the radial direction than the outer divider bars.

According to the invention there is also provided a direct smelting vessel that is fitted with the above-described apparatus for injecting material into the vessel.

According to the invention there is also provided an apparatus for injecting particulate and/or gaseous material into a metallurgical vessel for use in a metallurgical process, the apparatus comprising a duct through which to inject said material comprising a duct wall of concentric annular passages for in flow of cooling water from a rear end to a forward end of the duct along a first of said annular passages and for outflow of cooling water from the forward end to the rear end of the duct wall along a second of said annular passages;

said concentric annular passages provided by concentric sleeves consisting of an inner sleeve, an outer sleeve and an intermediate sleeve;

a duct tip at a forward end of the duct joining at least the inner and outer sleeves so as to provide a water flow connection between the first and second water flow passages;

said outer sleeve providing at least a part of an outer surface of said apparatus and having a rear portion of greater diameter than a forward portion;

said intermediate sleeve having a rear portion of greater diameter than a forward portion and said rear portion of said intermediate sleeve disposed adjacent said rear portion of said outer sleeve; and said rear portion of said outer sleeve and said rear portion of said intermediate sleeve configured such that the radial width of the annular passage provided between the outer sleeve and the intermediate sleeve adjacent the rear portion of the outer sleeve is generally the same as the radial width of the annular passage provided between the outer sleeve and the intermediate sleeve adjacent the forward portion of the outer sleeve.

The wall thickness of the rear portion of the outer sleeve may be generally the same as the wall thickness of the forward portion of the outer sleeve and the wall thickness of the rear portion of the intermediate sleeve may be greater than the wall thickness of the forward portion of the intermediate sleeve.

The apparatus may comprise a further sleeve member disposed adjacent the outer surface of the intermediate sleeve to thereby provide said greater diameter of said rear portion of said intermediate sleeve.

The further sleeve member may be spaced inwardly of and suspended from a rear portion of said apparatus so as to provide at least one water flow gallery for said inflow or said outflow of water to said duct wall.

The apparatus may comprise a housing member that connects a rear end of said inner sleeve with said rear end of said outer sleeve and wherein a rear portion of said intermediate sleeve is disposed inwardly of an end of said housing to thereby provide a water flow path rearwardly of said intermediate sleeve.

The further sleeve member may be disposed forwardly of said rear portion of said intermediate sleeve so as to divide a rear portion of said apparatus into first and second water flow galleries for inflow and outflow of water to said annular passages.

The further sleeve member may be secured to said rear portion of said apparatus and a sliding seal is provided intermediate said further sleeve member and said intermediate sleeve so as to permit relative longitudinal movement of said intermediate sleeve and said further sleeve member.

A rear portion of said intermediate sleeve may be comprised of a first portion extending rearwardly of said further sleeve member and a second portion extending forwardly from said further sleeve member to said duct tip and a sliding seal may be provided between said second portion of said intermediate sleeve and said further sleeve member.

An internal surface of said intermediate sleeve and an external surface of said inner sleeve may be separated by at least one dividing bar extending in a spiral arrangement therebetween.

The first portion of said intermediate sleeve may be secured to said at least one dividing bar.

The inner diameter of the intermediate sleeve may be generally constant.

The external surface of the inner sleeve may be generally constant whereby the radial thickness of the water flow passage disposed between said inner sleeve and said intermediate sleeve may be generally constant along its length.

An internal surface of said outer sleeve and an external surface of said intermediate sleeve may be separated by at least one dividing bar extending in a spiral arrangement therebetween.

In order that the invention may be more fully explained, embodiments will be described in some detail with reference to the accompanying drawings in which.

Figure 1:
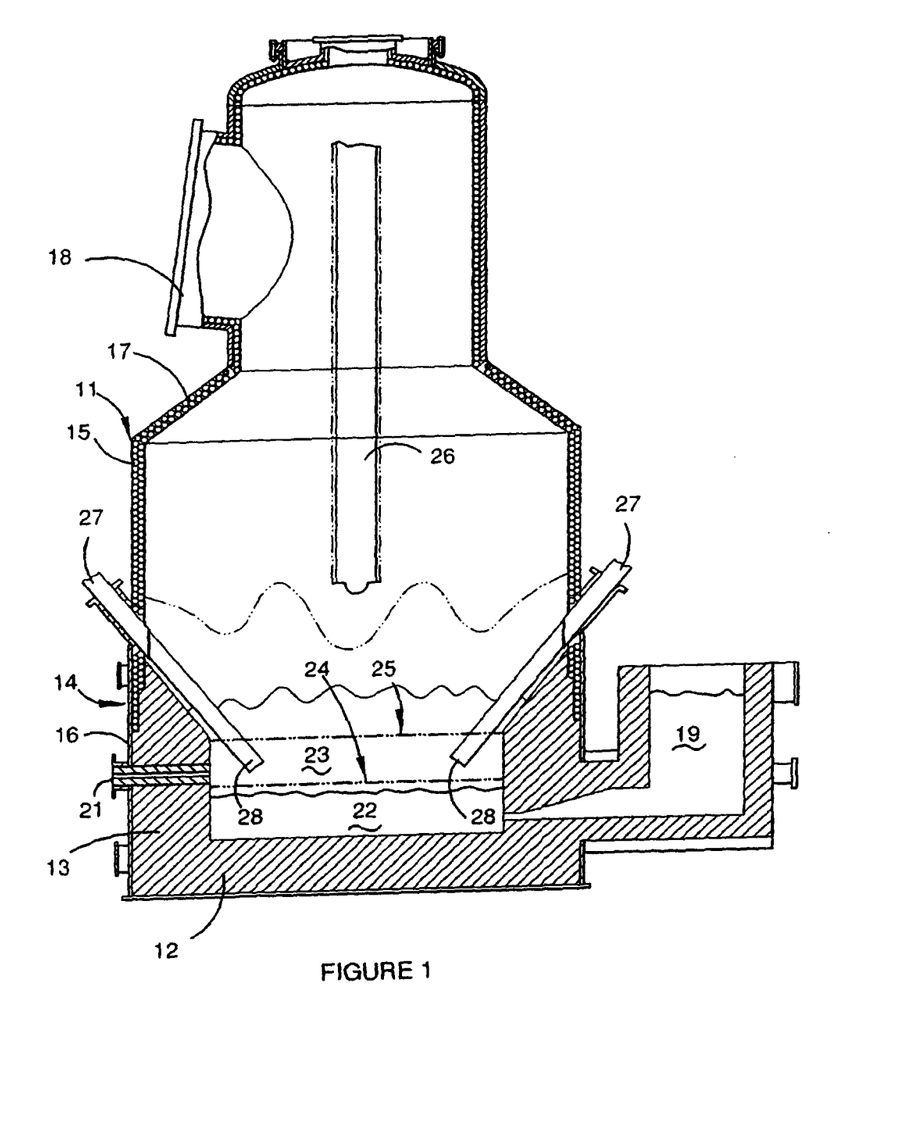
FIG. 1 is a vertical section through a direct smelting vessel incorporating one embodiment of a hot air injection lance constructed in accordance with the invention.

FIG. 1 illustrates a direct smelting vessel suitable for operation by the HIsmelt process as described in U.S. Pat. No. 6,083,296. The metallurgical vessel is denoted generally as 11 and has a hearth that includes a base 12 and sides 13 formed from refractory bricks; side walls 14 which form a generally cylindrical barrel extending upwardly from the sides 13 of the hearth and which includes an upper barrel section 15 and a lower barrel section 16; a roof 17; an outlet 18 for off-gases; a forehearth 19 for discharging molten metal continuously; and a tap-hole 21 for discharging molten slag.

In use, the vessel contains a molten bath of iron and slag which includes a layer 22 of molten metal and a layer 23 of molten slag on the metal layer 22. The arrow marked by the numeral 24 indicates the position of the nominal quiescent surface of the metal layer 22 and the arrow marked by the numeral 25 indicates the position of the nominal quiescent surface of the slag layer 23. The term "quiescent surface" is understood to mean the surface when there is no injection of gas and solids into the vessel.

The vessel is fitted with a downwardly extending hot air injection lance 26 for delivering a flow of air at a temperature in the order of 1200° C., so-called "hot air blast", into an upper region of the vessel and solids injection lances 27 extending downwardly and inwardly through the side walls 14 and into the slag layer 23 for injecting iron ore, solid carbonaceous material, and fluxes entrained in an oxygen-deficient carrier gas into the metal layer 22. The position of the lances 27 is selected so that their outlet ends 28 are above the surface of the metal layer 22 during operation of the process. This position of the lances reduces the risk of damage through contact with molten metal and also makes it possible to cool the lances by forced internal water cooling without significant risk of water coming into contact with the molten metal in the vessel.

Figure 2:
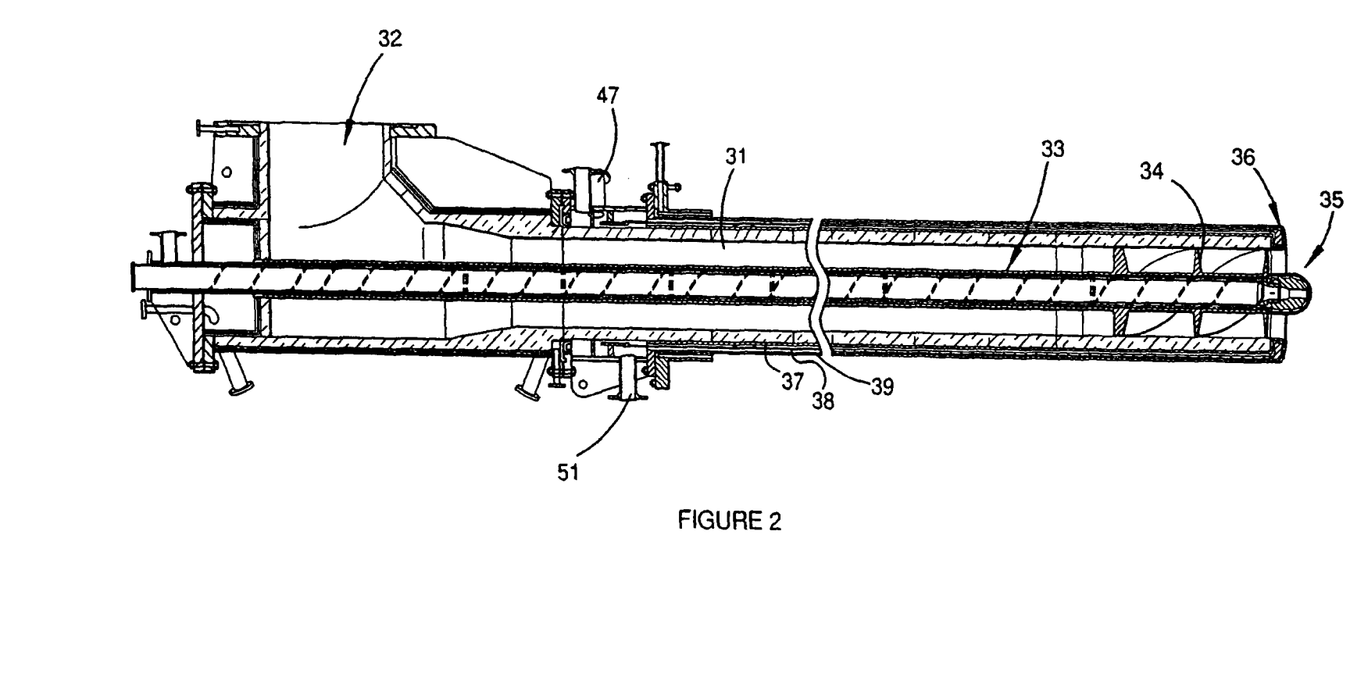
FIG. 2 is a longitudinal cross-section through the hot air injection lance.
Figure 3:
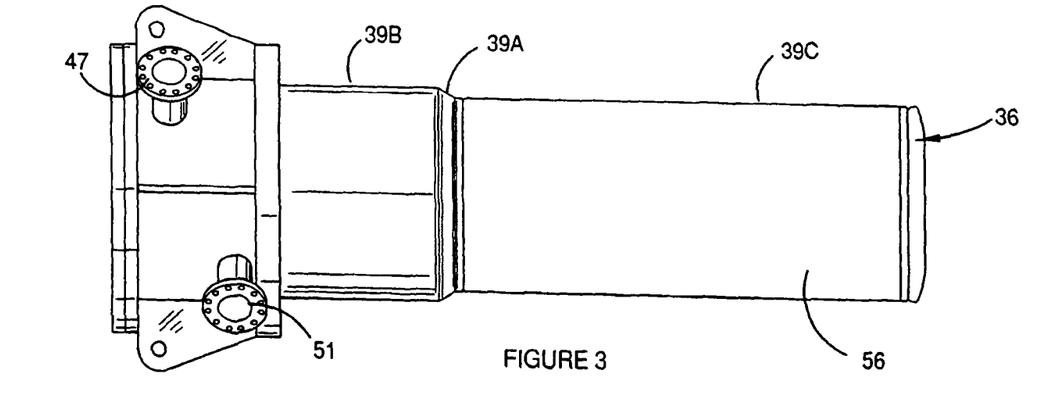
FIG. 3 is a side elevation of a forward part of another embodiment of the lance.
Figure 4:
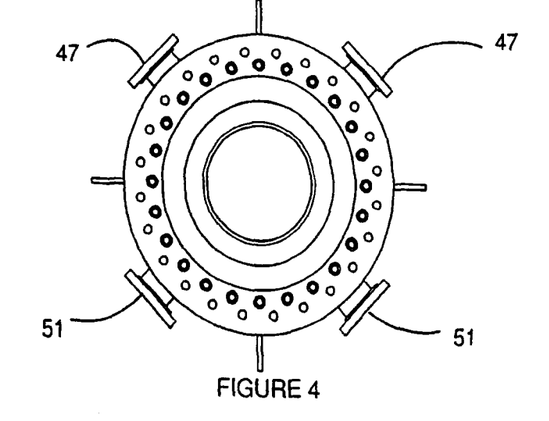
FIG. 4 is an end elevation of the forward part of the lance shown in FIG. 3.
Figure 5:
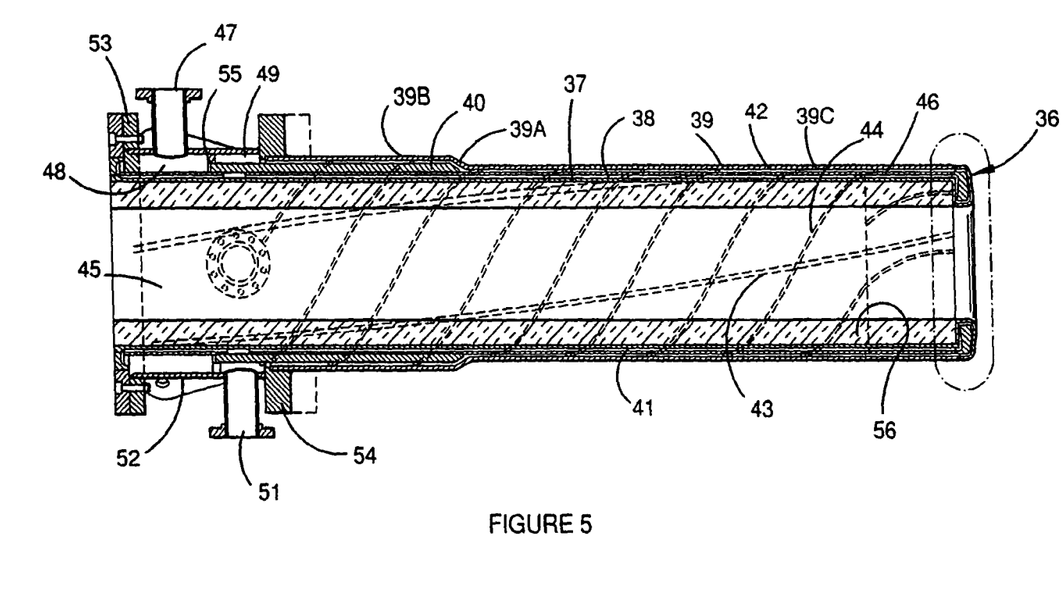
FIG. 5 is a longitudinal cross-section through the forward part of the lance shown in FIG. 3.

The construction of different embodiments of the hot air injection lance 26 is illustrated in FIGS. 2 to 18. FIG. 2 depicts a first embodiment and FIGS. 3-5 depict a second embodiment. Equivalent components have the same numbering in FIGS. 2-5. The lance tip shown in FIGS. 6-18 is described in the contest of the second embodiment of the lance shown in FIGS. 3-5. The lance tip shown in FIG. 2 has the same construction.

Referring now to FIG. 2 lance 26 comprises an elongate duct 31 which receives hot gas through a gas inlet structure 32 and injects it into the upper region of vessel. An annular duct tip 36 is disposed at the forward end of the gas flow duct 31. The lance includes an elongate central tubular structure 33 which extends within the gas flow duct 31 from its rear end to its forward end. Adjacent the forward end of the duct, central structure 33 carries a series of swirl imparting vanes 34 for imparting swirl to the gas flow exiting the duct. Swirl vanes 34 may be formed to a four start helical configuration. Their inlet (rear) ends may have a smooth transition from initial straight sections to a fully developed helix to minimise turbulence and pressure drop.

The forward end of central structure 33 has a domed nose 35 which projects forwardly beyond the tip 36 of duct 31 so that the forward end of the central body and the duct tip co-act together to form an annular nozzle for divergent flow of gas from the duct with swirl imparted by the vanes 34.

The wall of the main part of duct 31 extending downstream from the gas inlet 32 is internally water cooled. This section of the duct is comprised of a series of three concentric steel tubes 37, 38, 39 extending to the forward end part of the duct where they are connected to the duct tip 36.

In the second embodiment as depicted in FIGS. 3-5 outer tube 39 is stepped at 39A so that the rear part 39B of that tube is of greater diameter than the forward part 39C. The rear part of intermediate tube 38 is thickened by an external sleeve 40 disposed within the rear portion 39B of the outer tube 39. An inner annular space 41 of constant radial width is defined between the tubes 37, 38 and an outer annular space 42 of a smaller constant radial width is defined between the tubes 38, 39, both spaces 41, 42 extending back from the tip through to the rear part of the duct with the outer annular space 42 extending outwardly and back along the enlarged diameter rear portion 39B of the outer tube 39. The annular spaces 41, 42 are subdivided into inner and outer water flow passages by spirally extending inner divider bars 43 and outer spirally extending divider bars 44 respectively to form a series of four spirally extending inner flow passages 45 and a second series of four spirally extending outer flow passages 46.

Cooling water is supplied to the inner passages 45 through two water inlets 47 and an annular inlet manifold 48 at the rear end of the duct. The water flows forwardly along the spiral passages 45 to the tip 36 through which it flows in the manner to be described later in this specification back into the outer spirally extending passages 46 along which it flows back to the rear end of the duct to exit through an outlet manifold 49 and two water outlets 51.

The inner water flow passages 45 extend in a four-start helical array. The outer water flow passages 46 also extend in a four-start helical array but at a much shorter pitch than the spiral inner passages 45. More specifically the inner passages 45 extend through only approximately one quarter of a turn in extending from the rear end to the rear end of the duct to the tip whereas the outer return passages 46 extend at a much shorter pitch through several turns in the distance from the tip back to the outlet manifold 49. This increases the residence time of the water within the outer passages 46 to enhance cooling of the outer parts of the duct. The radial width of the inner passages 45 is greater than the radial width of the outer passages 46 and the water flow is accelerated as it flows through the tip to enhance heat extraction through the tip, a constant volumetric flow being maintained through the narrower outer flow passages 46.

The inner divider bars 43 extend spirally around and are welded to the outer peripheral surface of the inner duct tube 37 and flush fitted within the intermediate tube 38. The outer divider bars 44 forming the outer flow passages extend spirally around and are welded to the outer peripheral surface of the intermediate tube 38 (including the thickened rear portion 39H of the second embodiment) and flush fitted within the outer duct tube 39 (including the enlarged diameter rear portion 39B of that tube).

The rear end of duct tube 39 is connected to a tubular housing 52 which receives the rear ends of the inner and intermediate tubes 37, 38 and carries the water inlets 47 and outlets 51.

External sleeve 40 is disposed inwardly of and secured to tubular housing 52. This divides the rear portion of the lance into two water flow galleries, one for inflow of water 48 and one for outflow of water 49.

The intermediate tube 38 is located inwardly of an end wall of said housing 52 to provide a flow path from gallery 48 to inner passage 45.

Housing 52 is provided with a rear flange 53 for connection to a gas inlet structure, such as inlet structure 32 in the first embodiment. Flange 53 is also connected to a mounting flange 54 for connection of the lance with a vessel. In the first embodiment, flange 54 suspends the lance in a vertical orientation within the vessel with all of its weight taken through the outer duct tube 39.

The second embodiment may be suspended at an angle to the vertical, with the larger diameter portion 39B providing a mounting sleeve for location in mounting nozzles positioned on a vessel. Typically, in a vessel of the type depicted in FIG. 1, a number of such nozzles, would be located on roof 17 and lances of the type depicted in the second embodiment would replace lance 26 depicted in FIG. 1. Typically the large diameter portion 39B has a length of between one quarter and one half of the length of the lance.

The rear end of the intermediate tube 38 is supported by a sliding seal 55 within housing 52 to permit relative longitudinal movements of the tubes on differential expansion of the various lance components. In particular, intermediate tube 38 may be separated into a first portion extending rearwardly of the lance and secured to spiral dividing bars 43. A second portion of intermediate tube 38 extends forwardly to the duct tip.

The water cooled duct 31 is internally lined with internal refractory lining 56 that fits within the inner tube 39 of the duct and extends through to the water cooled tip 36 of the duct. The inner periphery of the duct tip 36 is generally flush with the inner surface of the refractory lining which defines the effective flow passage for gas through the duct.

The outer peripheral surface 56 of the forward part of outer tube 39, which in the second embodiment is between the step 39A and the tip 36, may be roughened or provided with projections to serve as keying formations to promote accretion of slag on that surface, the slag serving as a protective layer against over-heating of that surface.

Duct tip 36 is of annular formation and is comprised of an annular inner end component 61 an annular outer end component 62 and an annular central component 63 located between the inner and outer components. The outer end component 62 is provided with a plurality of radially extending ribs to divide the space between that outer end component 62 and the central component 63 into discrete radial passages 64 for flow of water around the tip as it flows from the spiral inflow passages 45 to the spiral outflow passages 46. The ribs on the outer end component 62 comprise a first series of ribs 65 spaced circumferentially of the outer end component and a second series of ribs 66 spaced circumferentially of the outer end component between the ribs 65 of the first series. The ribs 65 of the first series project from the outer component further than the ribs 66 of the second series. The central component 63 is provided with a series of radial grooves 67 to receive the ribs 65 of the first series, the shallower ribs of the second series merely abutting the central component 63 of the tip between the taller ribs 65 interfitted into the grooves 67. Outer end parts of the taller ribs 65 are welded at locations 68 to the central component 63 to firmly fix the outer and central components 62, 63 together with the ribs 65, 66 subdividing a space between them into the discrete water flow passages 64. The space 69 between the inner tip component 61 and the central component 63 is undivided and so provides a single inwardly directed annular flow path from the inflow passages 45 to the discrete tip passages 64 which extend radially outwardly and back around the outer part of the tip toward the outflow passages 46. The space between the outer end components 62 and the central components 63 which is divided by the ribs 65, 66 into the discrete water flow passages 64 narrows in the radially outward directions along the passages so that the passages 64 decrease in effective cross-section in the radially outward direction to accelerate the cooling water as it flows through the tip.

Figure 6:
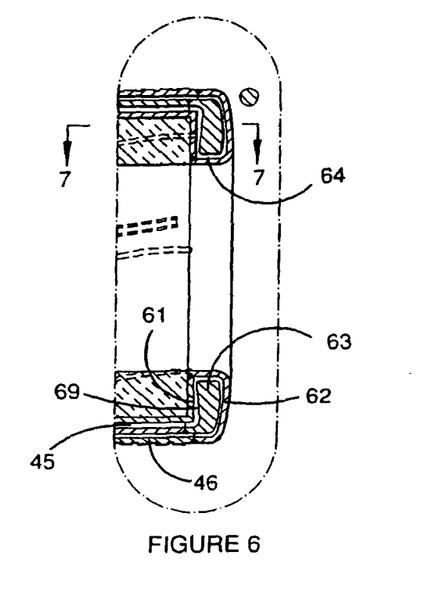
FIG. 6 is an enlargement of a forward part of the lance of FIG. 5 showing the construction of a lance tip—noting that the lance tip of the lance shown in FIG. 2 has the same construction.
Figure 7:
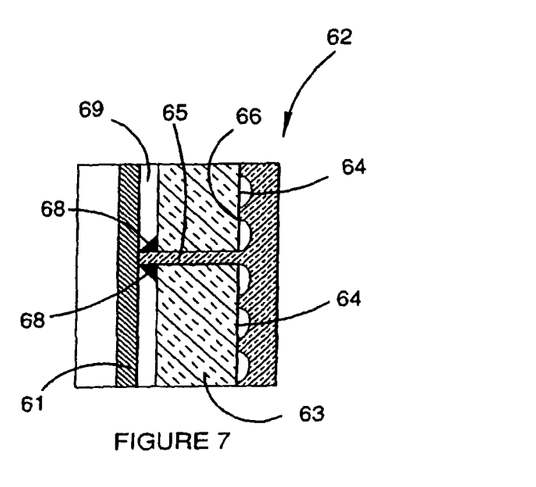
FIG. 7 is a cross-section on the line 7-7 in FIG. 6.
Figure 8:
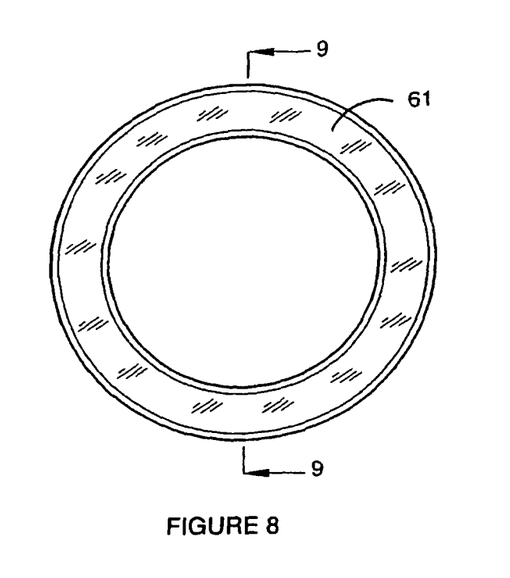
FIG. 8 illustrates an inner end component of the annular tip of the lance.
Figure 9:
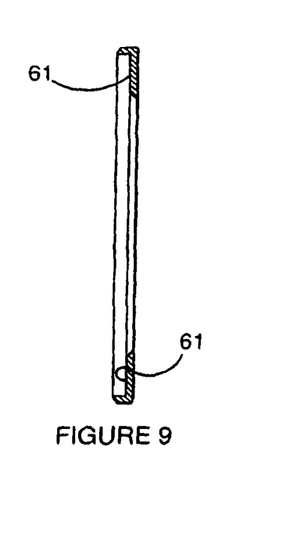
FIG. 9 is a cross-section on the line 9-9 in FIG. 8.
Figures 10, 11:
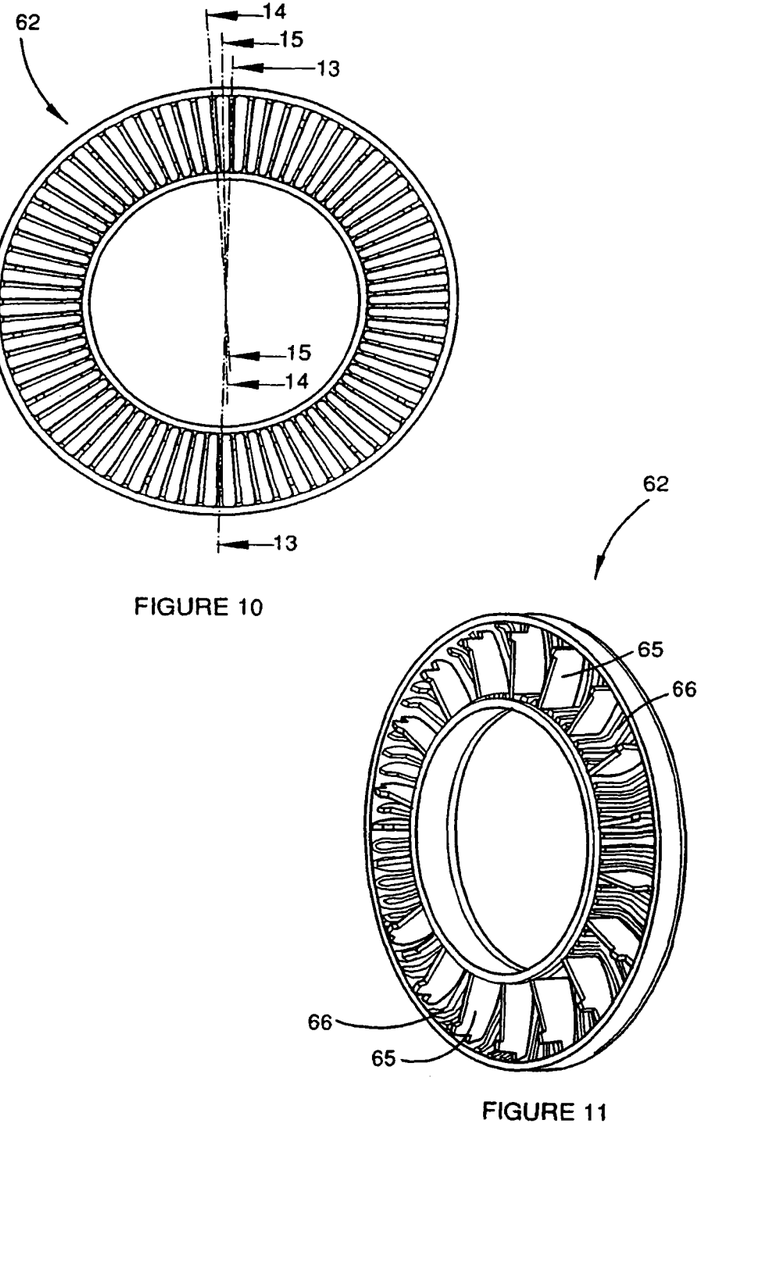
FIG. 10 illustrates an outer end component of the lance tip.
FIG. 11 is a perspective view of an inner face of the component shown in FIG. 10.
Figure 12:
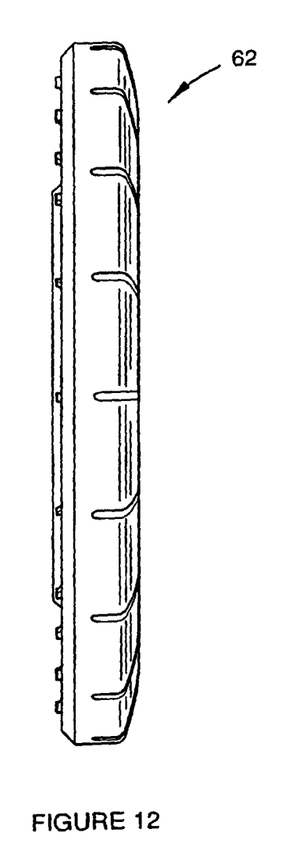
FIG. 12 is a diagrammatic side view of the component illustrated in FIG. 10.
Figure 13:
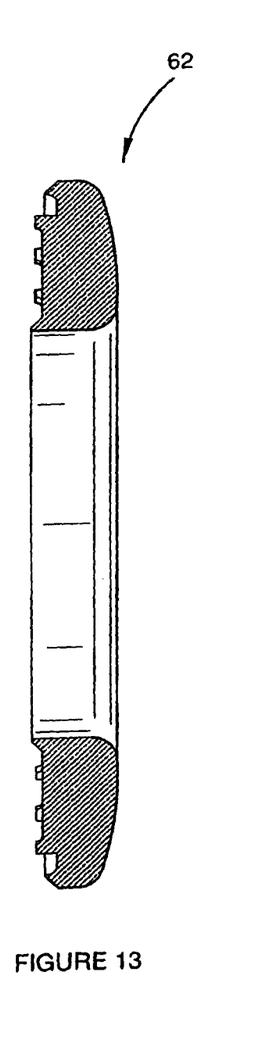
FIG. 13 is a cross-section on the line 13-13 in FIG. 10.
Figure 14:
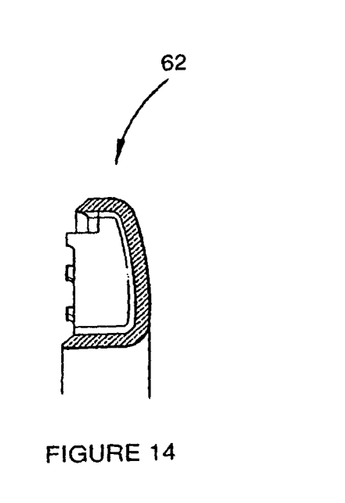
FIG. 14 is a cross-section on the line 14-14 in FIG. 10.
Figure 15:
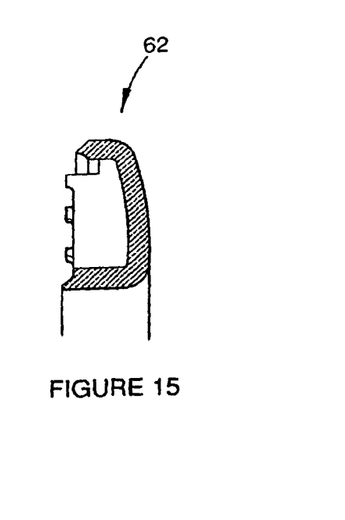
FIG. 15 is a cross-section on the line 15-15 in FIG. 10.
Figure 16:
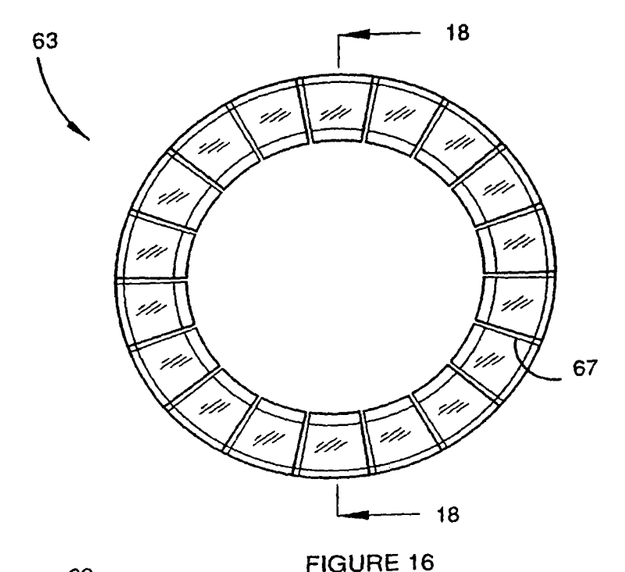
FIG. 16 illustrates a central component of the duct tip.
Figure 17:
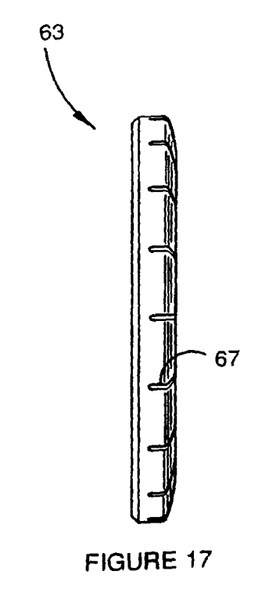
FIG. 17 is a side elevation of the tip component illustrated in FIG. 16.
Figure 18:
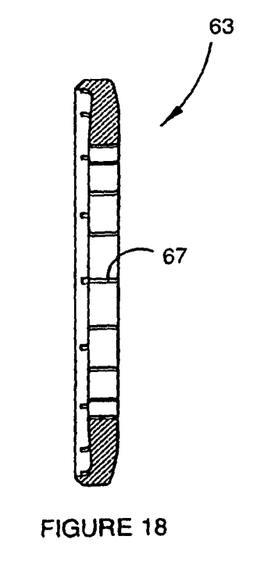
FIG. 18 is a cross-section on the line 18-18 in FIG. 16.

The inner outer and central components 61, 62, 63 of the tip are welded together and are all made of a high purity copper so as to promote effective and even heat transfer through the tip and to avoid any movement between the components due to differential thermal expansion which might otherwise affect the formation and size of the discrete water flow passages through the tip.

Although the illustrated embodiment of the invention is a gas injection lance it will be appreciated that the annular duct tip, could also be employed on solids injection lances, for example lances of the general construction disclosed in International Application PCT/AU2005/001603. It is accordingly to be understood that the invention is not limited to the constructional details of the illustrated embodiments and that many variations will fall within its scope.

By way of example, whist the embodiments of the lance are described as hot air injection lances, the invention is not so limited and extends to injection of any suitable gas and to injection of particulate material. By way of example, injected particulate material may include iron ore fines and/or carbonaceous material.

The invention claimed is:

1. An apparatus for injecting particulate and/or gaseous material into a metallurgical vessel for use in a metallurgical process, the apparatus comprising
    a duct through which to inject said material comprising a duct wall of concentric annular passages for in flow of cooling water from a rear end to a forward end of the duct along a first of said annular passages and for outflow of cooling water from the forward end to the rear end of the duct wall along a second of said annular passages;
    said concentric annular passages provided by concentric sleeves consisting of an inner sleeve, an outer sleeve and an intermediate sleeve;
    an annular duct tip at the forward end of the duct joining at least the inner and outer sleeves so as to provide a water flow connection between the first and second water flow passages;
    said duct tip having an annular inner end component, an annular outer end component, an annular central component located between the inner and outer end components, and a plurality of radially extending dividers, which are disposed radially with respect to the duct and are spaced circumferentially within the duct tip, and which divide a space between the outer end component and the central component into discrete radial passages to serve as internal water flow passages through which water is to flow radially with respect to the annular duct tip;
    said outer sleeve providing at least a part of an outer surface of said apparatus and having a rear portion of greater diameter than a forward portion;

said intermediate sleeve having a rear portion of greater diameter than a forward portion and said rear portion of said intermediate sleeve disposed adjacent said rear portion of said outer sleeve; and said rear portion of said outer sleeve and said rear portion of said intermediate sleeve configured such that the radial width of the annular passage provided between the outer sleeve and the intermediate sleeve adjacent the rear portion of the outer sleeve is generally the same as the radial width of the annular passage provided between the outer sleeve and the intermediate sleeve adjacent the forward portion of the outer sleeve.

2. The apparatus as claimed in claim 1 wherein the wall thickness of the rear portion of the outer sleeve is generally the same as the wall thickness of the forward portion of the outer sleeve and the wall thickness of the rear portion of the intermediate sleeve is greater than the wall thickness of the forward portion of the intermediate sleeve.

3. The apparatus as claimed in claim 1 wherein a further sleeve member is disposed adjacent the outer surface of the intermediate sleeve to thereby provide said greater diameter of said rear portion of said intermediate sleeve.

4. The apparatus as claimed in claim 2 wherein said further sleeve member is spaced inwardly of and suspended from a rear portion of said apparatus so as to provide at least one water flow gallery for said inflow or said outflow of water to said duct wall.

5. The apparatus as claimed in claim 4 wherein a housing member connects a rear end of said inner sleeve with said rear end of said outer sleeve and wherein a rear portion of said intermediate sleeve is disposed inwardly of an end of said housing to thereby provide a water flow path rearwardly of said intermediate sleeve.

6. The apparatus as claimed in claim 5 wherein said further sleeve member is disposed forwardly of said rear portion of said intermediate sleeve so as to divide a rear portion of said apparatus into first and second water flow galleries for inflow and outflow of water to said annular passages.

7. The apparatus as claimed in claim 6 wherein said further sleeve member is secured to said rear portion of said apparatus and a sliding seal is provided intermediate said further sleeve member and said intermediate sleeve so as to permit relative longitudinal movement of said intermediate sleeve and said further sleeve member.

8. The apparatus as claimed in claim 7 wherein a rear portion of said intermediate sleeve is comprised of a first portion extending rearwardly of said further sleeve member and a second portion extending forwardly from said further sleeve member to said duct tip and a sliding seal is provided between said second portion of said intermediate sleeve and said further sleeve member.

9. The apparatus as claimed in claim 8 wherein an internal surface of said intermediate sleeve and an external surface of said inner sleeve are separated by at least one dividing bar extending in a spiral arrangement therebetween.

10. The apparatus as claimed in claim 9 wherein said first portion of said intermediate sleeve is secured to said at least one dividing bar.

11. The apparatus as claimed in claim 1 wherein the inner diameter of the intermediate sleeve is generally constant.

12. The apparatus as claimed in claim 11 wherein the external surface of the inner sleeve is generally constant whereby the radial thickness of the water flow passage disposed between said inner sleeve and said intermediate sleeve is generally constant along its length.

13. The apparatus as claimed in claim 1 wherein an internal surface of said outer sleeve and an external surface of said intermediate sleeve are separated by at least one dividing bar extending in a spiral arrangement therebetween.

14. A direct smelting vessel that is fitted with the apparatus for injecting material into the vessel defined in claim 13.

* * * * *